March 27, 1934.   A. J. BORST, JR   1,952,115
AUTOMOBILE SHACKLE
Original Filed March 8, 1930
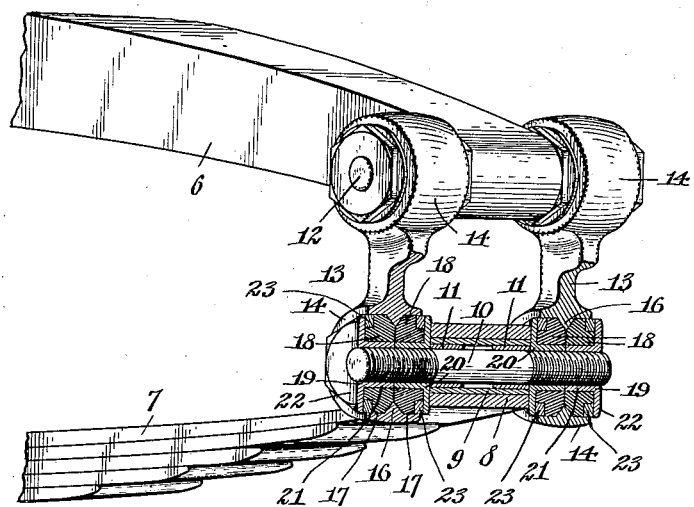
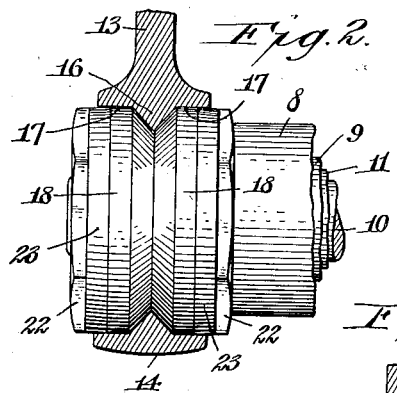
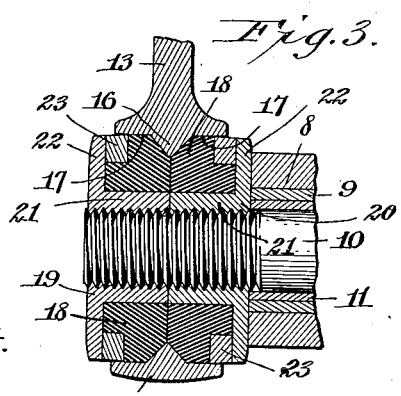
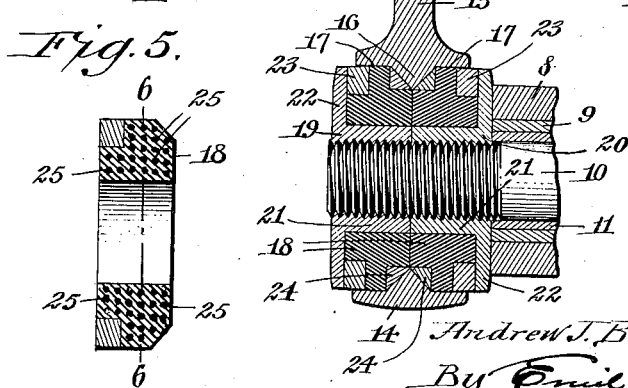
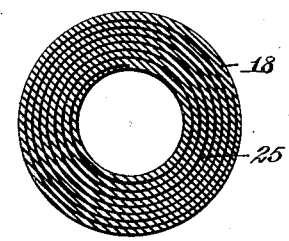
Andrew J. Borst, Jr. Inventor.
By Emil Kunhart
Attorney.
Witness:
J. J. Oberst.

Patented Mar. 27, 1934

1,952,115

UNITED STATES PATENT OFFICE 1,952,115

AUTOMOBILE SHACKLE

Andrew J. Borst, Jr., Buffalo, N. Y.

Application March 8, 1930, Serial No. 434,369
Renewed August 11, 1933

10 Claims. (Cl. 267—54)

My invention relates to automobile shackles, and has more particularly reference to that type of shackle having a rubber or other like cushion element or elements embodied in its construction; such as set out in my copending application, Serial No. 308,603.

Like the construction illustrated in my said copending application, this invention is designed to assure easier riding qualities for an automobile and to eliminate side sway or whipping of the automobile body.

This invention has for one of its objects, the provision of an automobile shackle in which rubber cushions are retained within the eyes of the shackle members by means of pins or bolts and are adapted to be held against rotation and lengthwise movement within the eyes of said shackle members and against lengthwise movement on said pins or bolts, so that under constant oscillation of said shackle members said cushions are subjected to compression radially outwardly at one side of their axes and inwardly at the other side thereof.

Another object of my invention is to so construct the rubber cushions that when positioned in the shackle members, they may or may not be compressed in the direction of their axes, but they are not compressed in such direction thereafter; in fact, they are held against movement in such direction, under compression, or bodily, and are incapable of being rotated under the oscillating movements of the shackle members in which they are confined.

A further object of my invention is the provision of cushions which are compressible at right angles to their axes and are so confined that when subjected to compression action in the manner stated, they are held against expansion lengthwise or in the direction of their axes.

A still further object is to provide new and novel cushion elements within shackles in such relation to other parts that they will not wear readily, and to include in the rubber or rubber composition, a lubricant which is retained within the microscopic cells of the rubber or rubber composition so as to keep the metallic parts of the shackle in contact therewith, properly lubricated; thus preventing rust.

With the above and other objects in view, to appear hereinafter, my invention consists in the novel parts, in the new and novel features of construction, and in the arrangement, and combination of parts to be hereinafter described and particularly pointed out in the subjoined claims.

In the drawing:

Fig. 1 is a sectional perspective view of my improved cushion shackle, showing the same attached to and connecting a side member of an automobile chassis with one of the springs supporting the same.

Fig. 2 is a vertical section through the lower part of one of the shackle members showing a portion of the eye of a spring and the cushion elements in elevation within the lower eye of said shackle member.

Fig. 3 is a vertical section of the lower end of one of the shackle members and of the adjacent parts supported thereby.

Fig. 4 is a similar section, showing the cushion elements in modified form.

Fig. 5 is a detail longitudinal sectional view of one of the cushion elements, showing the cords or textile layers embodied in the construction thereof.

Fig. 6 is a cross section taken on line 6—6, Fig. 5.

Reference being had to the drawing in detail, the numeral 6 designates one of the side members of an automobile chassis or frame and 7 a portion of an automobile spring provided with an eye 8 at its end. In the eye, a bronze or other bushing 9 is fitted, and through said bushing a shackle bolt 10 is passed; opposite ends of said bolt being screw-threaded and arranged to project from opposite ends of said eye. The bolt shown is of smaller diameter than the bore of said bushing and is held axially in said bushing by means of tapered nipples 11, which are slit longitudinally so as to be compressed onto the body when driven into said bushing from opposite ends; thus holding said bolt non-rotatably within the eye of the spring.

If desired, the shackle bolt may be of a size to snugly and non-rotatably fit into said bushing, or it may be non-rotatably fitted in the eye of the spring directly, and the bushing dispensed with.

It is to be understood that the side or chassis member 6 also has an eye formed through its end, which may or may not have a bushing therein. A shackle bolt 12 extends through this eye and may be held therein in any suitable manner; for example, as described with reference to the bolt 10, or otherwise. Like the bolt 10, it also has opposite ends screw-threaded and projecting from opposite ends of the eye in said side or chassis member.

Broadly considered, when reference is had to the eye of the spring or said side or chassis member, it may or may not include the bushing and nipples, as either or both of these may be dispensed with, if desired.

In any event, the shackle bolts 10 and 12 are driven or otherwise non-rotatably secured, respectively, in an eye of the side or chassis member and in an eye of the automobile spring, so that they are firmly held therein against both rotative and longitudinal movements and so that the screw threaded end portions thereof project from opposite ends of said eyes.

Shackle bars or hanger members 13 connect correspondingly projecting ends of the shackle bolts together and opposite ends of these bars or members have apertured enlargements 14 of substantially circular formation; the aperture 15, or eye as it may be termed, in each enlargement being cylindrical and considerably larger in diameter than the shackle bolts. The aperture or eye 15 at each end of each shackle bar or member has an internal V-shaped rib or flange 16 centrally between its ends,—opposite inclined sides of which co-operate with the cylindrical inner surface portions 17 of the eye for contact with the exterior surfaces of cushioning elements 18, which are constructed of rubber, rubber composition, or any other suitable cushioning material.

Flanged sleeve nuts 19, 20, are screw-threaded onto the screw-threaded projecting ends of the shackle bolts and for convenience, may be referred to as inner and outer sleeve nuts, respectively; each end of each bolt 10 and 12, having two such sleeve nuts applied thereto in reverse order. The sleeve portion of each sleeve nut is designated by the numeral 21 and the flange thereof by the numeral 22. The flanges 22 are preferably of hexagonal formation for convenient application thereto of a wrench or other suitable tool for applying, tightening, or adjusting the sleeve nuts on the shackle bolts.

By reversing the sleeve nuts on the shackle bolts, the unflanged ends, which may be referred to as the inner ends of the sleeve portions of the nuts, abut against each other. Thus, the flanges 22 of said nuts are positioned outside of the eye of the spring or frame member, as the case may be, and may, if desired be larger than said eyes. The abutting ends of the sleeve nuts are alined with the apex, ridge, or sharp edge of the V-shaped bead or flange 16, and the cushioning elements 18 positioned on the sleeve portions of said sleeve nuts within the eye 15 and between the flanges 22 of said nuts.

Said cushioning elements are in the main of cylindrical formation and of a diameter to snugly fit into the eye 15 and they are provided with axial bores of a diameter to snugly fit onto the sleeve portions of the sleeve nuts. Their inner ends normally extend beyond the inner ends of the sleeve portions of the nuts and therefore abut end to end when inserted in the eyes of the shackle members, and they have their outer peripheral surfaces beveled or made conical at their inner ends to conform to the inclined opposite faces of the internal bead or flange 16. The abutting ends of said cushioning elements are alined with the apex, ridge, or sharp edge of said flange, and upon tightening the sleeve nuts to bring the inner ends of their sleeve portions in contact, these cushioning elements are compressed in their direction of the axes and caused to expand radially inwardly against the sleeve portions of the nuts and outwardly against the inner surface of the eyes in which they are confined. Where so arranged, the inner ends of these cushioning elements are also alined with the inner ends of the sleeve portions of the nuts. The beveled or conical portions of these cushion elements are in firm contact with the opposite inclined faces of the internal flange 16, and with the outer peripheral faces of the sleeve portions of the nuts and the inner peripheral face of the eye and the combined length of these cushioning elements equals the distance between the flanges at the outer ends of the sleeve nuts.

The inner surface of eyes 15 at opposite ends of the shackle bars or members may be cadmium-plated or otherwise rendered non-corrosive, or these bars or members may be constructed of non-corroding material and the sleeve nuts similarly treated or constructed. I prefer, however, to construct the sleeve nuts of die-casting material, which is not only non-corrosive, but light and durable as well.

Applied to the outer end of each of the cushioning elements by vulcanization when forming the cushioning elements of rubber or rubber composition, or otherwise when using other suitable cushioning material, is a guard ring 23, which is also preferably formed of non-corrosive metal; but any other suitable material not effected by moisture may be used. These guard rings protect the cushioning material and normally have portions thereof exposed between the flanges 22 of the sleeve nuts and the end faces of the eyes 15.

In Fig. 4 of the drawing, the cushioning elements have their beveled or conical surfaces formed by contact rings 24, which may be of fiber molded into annular recesses formed in said elements at such points, said contact rings being of triangular formation in cross section. These contact rings may also be formed of some non-corrosive metal, but due to the fact that they are positioned where moisture cannot reach them, they may be constructed of fiber. Fiber has, however, been found unsuitable for use in constructing the guard rings 23 at the outer ends of the cushioning elements, owing to the fact that water coming in contact with the same on account of their exposed position, will cause them to swell.

I preferably construct the cushioning elements of a semi-hard yielding rubber or rubber composition, with a certain percentage of lubricating material; for example, paraffin embodied in the composition; and arranged in spaced layers lengthwise and parallel with the axis of the cushioning elements, cords of cotton, cotton fabrics, or other suitable material 25 are vulcanized within the rubber or rubber composition. Said layers may be formed in various ways, but they are preferably coiled around between layers of rubber rolled around a mandrel preparatory to vulcanizing the rubber. These cords may be otherwise arranged in the cushioning elements and they are saturated with the lubricant. As the roller composition has minute or microscopical cells formed throughout the same and portion of the cords pass through such cells, the lubricant is carried to the outer surface of the rubber cushioning elements so as to keep the surfaces of the sleeve nuts in contact with said cushioning elements and the inner walls of the shackle eyes lubricated at all times. The device is therefore a self-lubricating one, and while in contour, the cushioning elements are cylindrical when supporting the weight of an automobile body normally loaded, when the automobile passes through ruts and over obstructions or elevated portions of a road, these cushioning elements are compressed radially so that they assume a somewhat oval formation in cross section under compression without being permitted to expand in the direction of their length.

By employing the V-shaped annular internal beads or flanges 16 within the eyes of the shackle bars or members 13, said bars or members are securely held to the shackle bolts; and by providing the flanges 22, which may be termed nuts integral with the sleeves 21, the exact relation of the two cushioning elements necessary for proper functioning, is assured.

When the cushioning elements become worn, it may be found necessary to compress such elements lengthwise toward each other in order to cause expansion of the same diametrically, both inwardly against the shackle bolts and outwardly against the walls of the eyes in the shackle bars or members with a view of preventing rotation of said cushioning elements, both on said bolts, or more particularly on the nut sleeves, and within said eyes. In order to accomplish this the abutting ends of the sleeve nuts may be filed away sufficiently to assure compression lengthwise of the cushioning elements when tightening said nuts on the shackle bolts.

The oscillation of the shackle bars or members, due to the flexing of the automobile springs, will cause the cushioning elements to be subjected to tortional strain componently with compression force applied thereto radially, and due to the fact that the cushioning elements are non-rotatable on the shackle bolts and within the eyes of the shackle bars or members, considerable resistance is offered to the flexing of the automobile springs, thus assuring a gradual movement downwardly of the automobile body and a gradual upward or recovery movement; this being highly desirable to assure good riding qualities.

The tortional strain applied to the cushioning elements are in no manner harmful and the rubber composition from which said elements are constructed, especially when cords of the kind specified are embodied in the construction of such elements, will not become torn, disintegrated, or be otherwise effected.

It is to be noted that the flanged outer end of the inner sleeve nut is threaded onto the shackle bolts so that it lies in contact with the end of the eye formed in the spring, or the end of the eye formed in the frame member. Thus the inner surface of the flange provides a definite stop for the outer end of the inner cushioning element. The flange or nut at the outer end of the outer sleeve nut, by reason of the inner end of said outer sleeve nut abutting against the inner end of the inner sleeve nut is definitely spaced from the flange or nut of the inner sleeve nut and the bores in the cushioning elements are of a size to necessitate forcing said cushioning elements onto the sleeve portions of said sleeve nuts and into the eyes of the shackle bars. The cushioning elements are therefore positively confined between the sleeve portions of the sleeve nuts and the walls of the eyes of the shackle bars or members in one direction, and between the flanges or nut portions of said sleeve nuts in a direction at right angles thereto; and as said sleeve nuts are firmly threaded onto the shackle bolts and the V-shaped beads or flanges in the eyes of said shackle bars fit between portions of the cushioning elements, said shackle bars or members are firmly secured to the shackle bolts and connect the springs with the frame members of the automobile.

Having thus described my invention, what I claim is:

1. A shackle for automobiles, comprising shackle bolts projecting at opposite ends from spaced parts of an automobile, an abutting element secured to the projecting ends of each of said shackle bolts and having a flange thereon, an element similar to said flanges spaced therefrom, cushioning elements disposed on each of said abutting elements between said flanges and said similar elements, and a shackle bar having an eye surrounding each of said cushioning elements and an inward projection in each of said eyes clamped between the cushioning elements in each eye to prevent displacement of said shackle bar.

2. A shackle for automobiles, comprising shackle bolts projecting at opposite ends from spaced parts of an automobile, an abutting element secured to the projecting ends of each of said shackle bolts and having spaced-apart flanges thereon, cushioning elements disposed on said abutting elements between said flanges, and shackle bars surrounding said cushioning elements and having parts clamped between said cushioning elements to prevent displacement of said shackle bars.

3. A shackle for automobiles adapted to connect a frame member of the automobile with a spring thereof, comprising screw-threaded elements projecting from opposite sides of said frame member and said spring sleeve nuts threaded in pairs on each of said screw-threaded elements and having sleeve portions abutting end to end and nut-like flanges on the outer ends of said sleeve portions, a pair of cushioning elements surrounding the sleeve portions of each pair of said sleeve nuts and abutting at their inner ends, said cushioning elements having their outer ends in contact with said nut-like flanges, and shackle bars having eyes at opposite ends surrounding the cushioning elements on the screw-threaded elements projecting from said frame member and spring and having internal flanges against which said cushioning elements bear.

4. In a shackle for automobiles, a shackle bolt projecting from an automobile part and having its projecting end screw-threaded, a sleeve nut threaded onto the screw-threaded end of said shackle bolt and comprising a sleeve portion and a flange extending from the outer end of said sleeve portion and bearing against said automobile part, a cushioning element surrounding said sleeve portion and bearing at its outer end against said flange, said cushioning element being cylindrical formation along the major portion of its length and having a tapered inner end portion, a second sleeve nut screw-threaded onto said shackle bolt and having a flange at its outer end and a sleeve portion bearing at its inner end against the inner end of said first-mentioned sleeve portion, a cushioning element on the sleeve portion of said second-mentioned sleeve nut bearing at its outer end against the flange of said sleeve nut and at its inner end against the inner end of said first-mentioned cushioning element, being in the main of cylindrical formation and having a tapered inner end coacting with the tapered inner end of said first-mentioned cushioning element to form a V-shaped groove around said cushioning elements when in abutting relation, and a shackle bar having an eye surrounding said cushioning elements and provided with an internal V-shaped bead fitting into the V-shaped groove of said cushioning elements.

5. An automobile shackle, comprising a shackle bolt, a sleeve nut having a sleeve portion and a flange, a cushioning element surrounding said sleeve portion and formed of rubber composition, said cushioning element having a guard ring at its outer end vulcanized to said rubber composition, and a shackle bar having an eye surrounding said cushioning element, the outer end of said cushioning element bearing against the inner surface of the flange of said sleeve nut including the outer end face of said guard ring.

6. A shackle for automobiles, comprising a support having spaced flanges, a pair of cushioning elements abutting end to end and having their outer ends in contact with said flanges, said cushioning elements being formed of rubber composition and having contact rings surrounding the same at their outer ends, and a shackle bar having an eye provided with an internal bead against opposite faces of which said contact rings bear.

7. A shackle for automobiles, comprising a support having spaced flanges, a pair of cushioning elements abutting end to end and having their outer ends in contact with said flanges, said cushioning elements being formed of rubber composition and having contact rings surrounding the same at their outer ends and provided with beveled outer faces, and a shackle bar having an eye provided with an internal V-shaped bead against opposite faces of which said contact rings bear.

8. In a shackle for automobiles, a cushioning element formed of a rubber composition having lubricant absorbent material vulcanized therein.

9. In an automobile shackle, a cushioning element having an axial bore therethrough and a cylindrical exterior surface, said cushioning element being formed of a somewhat pliant material and having strands of different material possessing absorbent qualities extending therethrough.

10. A cushioning element for automobile shackles formed of composition material providing microscopical cells therein, a lubricant within said cells and absorbent strands extending through said material and saturated with said lubricant, said strands and the cells in the material feeding the lubricant to the surface of said cushioning element under compression of said material.

ANDREW J. BORST, Jr.